United States Patent
Hamanaka et al.

(10) Patent No.: US 11,927,834 B2
(45) Date of Patent: *Mar. 12, 2024

(54) LENS POSITIONING MECHANISM, LENS PRODUCING APPARATUS, AND METHOD FOR PRODUCING LENS MEMBER

(71) Applicant: HOYA LENS THAILAND LTD., Pathumthani (TH)

(72) Inventors: Akira Hamanaka, Tokyo (JP); Shinichi Yokoyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 103 days.

This patent is subject to a terminal disclaimer.

(21) Appl. No.: 17/217,458

(22) Filed: Mar. 30, 2021

(65) Prior Publication Data

US 2021/0302760 A1    Sep. 30, 2021

(30) Foreign Application Priority Data

Mar. 30, 2020   (JP) .................................. 2020-059561

(51) Int. Cl.
*G02C 7/02*   (2006.01)

(52) U.S. Cl.
CPC ............. *G02C 7/028* (2013.01); *G02C 7/021* (2013.01); *G02C 7/025* (2013.01)

(58) Field of Classification Search
CPC ......... G02C 7/025; G02C 7/028; G02C 7/021
USPC .................................................... 351/159.74
See application file for complete search history.

(56) References Cited

U.S. PATENT DOCUMENTS

2008/0098584 A1*   5/2008   Meyer ..................... B23B 29/26
                                                                  279/9.1
2018/0292754 A1   10/2018   Kikuchi et al.

FOREIGN PATENT DOCUMENTS

| DE | 226512 B    | * | 3/1984  |
|----|-------------|---|---------|
| DE | 226 512 A1  |   | 8/1985  |
| EP | 0532892 A1  | * | 3/1993  |
| JP | S57-47778 Y |   | 10/1982 |
| JP | S61-120936 A|   | 6/1986  |
| JP | 2005-81540 A|   | 3/2005  |
| JP | 2018-180168 A|  | 11/2018 |

OTHER PUBLICATIONS

Aug. 13, 2021 Extended Search Report issued in European Patent Application No. 21161708.9.

\* cited by examiner

*Primary Examiner* — James R Greece
(74) *Attorney, Agent, or Firm* — Oliff PLC

(57) ABSTRACT

A technique capable of easily and highly accurately perform positioning of a lens member having a convex optical surface. A lens positioning mechanism is configured to include: a member holding unit that has a function of holding a lens member via an auxiliary tool attached to a second surface of the lens member having a first surface, which is a convex optical surface, and the second surface, which is an optical surface facing the first surface, and biasing the held lens member toward a side of the first surface; and an attitude control unit that abuts on a predetermined portion on the first surface of the lens member biased on the member holding unit to regulate a position of the predetermined portion and positions the lens member in a predetermined attitude.

14 Claims, 8 Drawing Sheets

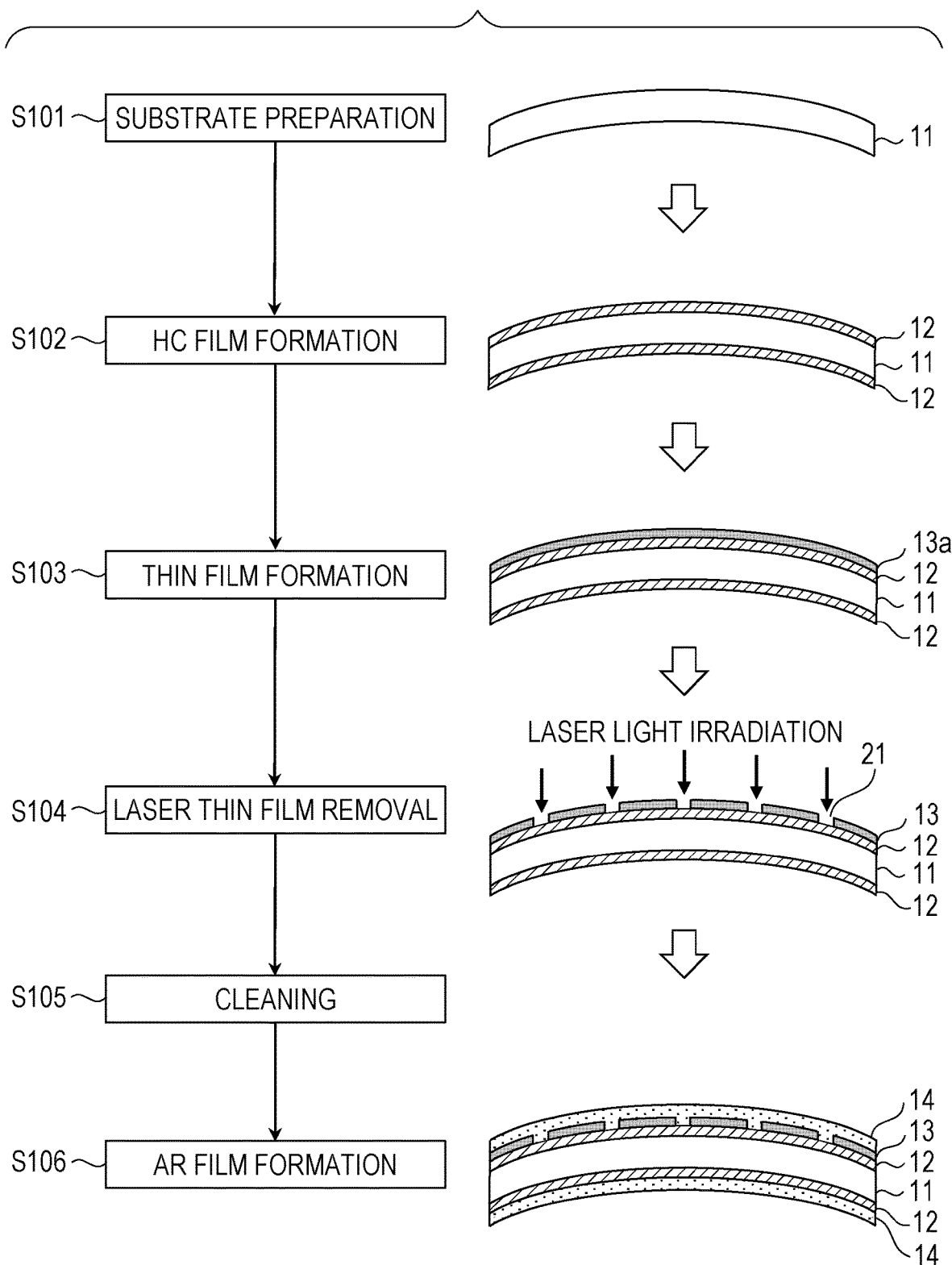

HORIZONTAL LINE

LENS POSITIONING MECHANISM, LENS PRODUCING APPARATUS, AND METHOD FOR PRODUCING LENS MEMBER

TECHNICAL FIELD

The present invention relates to a lens positioning mechanism, a lens producing apparatus, and a method for producing a lens member.

BACKGROUND ART

In recent years, there is a spectacle lens, obtained by patterning a predetermined pattern on a thin film ($SnO_2$ film, Cr film, or the like) on an optical surface of a lens substrate (see, for example, Patent Literature 1).

CITATION LIST

Patent Literature

Patent Literature 1: JP 2018-180168 A

SUMMARY OF INVENTION

Technical Problem

Positioning of an optical surface, which is a surface to be processed, is indispensable in order to perform patterning on a lens with high accuracy. However, when the optical surface is a convex curved surface, it is not always easy to accurately perform positioning of the optical surface.

An object of the present invention is to provide a technique capable of easily and highly accurately perform positioning of a lens member having a convex optical surface.

Solution to Problem

The present invention has been devised to achieve the above object.

A first aspect of the present invention is a lens positioning mechanism including:
- a member holding unit that has a function of holding a lens member via an auxiliary tool attached to a second surface of the lens member having a first surface, which is a convex optical surface, and the second surface, which is an optical surface facing the first surface, and biasing the held lens member toward a side of the first surface; and
- an attitude control unit that abuts on a predetermined portion on the first surface of the lens member biased on the member holding unit to regulate a position of the predetermined portion and positions the lens member in a predetermined attitude.

A second aspect of the present invention is the lens positioning mechanism according to the first aspect, in which
the attitude control unit is configured to abut on an annular region on the first surface as the predetermined portion to regulate the position.

A third aspect of the present invention is the lens positioning mechanism according to the first aspect, in which
the attitude control unit is configured to abut on three or more points on the first surface, which are separated from each other, as the predetermined portion to regulate the position.

A fourth aspect of the present invention is the lens positioning mechanism according to any one of the first to third aspects, in which
the lens holding unit has
- a pad that holds the second surface of the lens member by vacuum suction, and
- a joint that swingably supports the pad and is configured to be capable of switching between a movable state and a fixed state of a swinging portion.

A fifth aspect of the present invention is the lens positioning mechanism according to any one of the first to fourth aspects, in which
the lens holding unit has an elastic member that stretches and contracts along a biasing direction of the lens member.

A sixth aspect of the present invention is the lens positioning mechanism according to the fifth aspect, in which
the lens holding unit has a brake that maintains a bent state of the elastic member.

A seventh aspect of the present invention is the lens positioning mechanism according to any one of the first to sixth aspects, further including
a sensor unit that measures a relative position of a predetermined point on the first surface of the lens member with respect to a regulation position when positioned by the attitude control unit.

An eighth aspect of the present invention is the lens positioning mechanism according to any one of the first to seventh aspects, in which
the lens member is a spectacle lens.

A ninth aspect of the present invention is the lens positioning mechanism according to the eighth aspect, in which
the spectacle lens is an irregular-shaped lens after cutting or polishing to which the auxiliary tool is attached.

A tenth aspect of the present invention is a lens producing apparatus including:
- the lens positioning mechanism according to any one of the first to ninth aspects; and
- a member processing unit that performs a predetermined process on the first surface of the lens member positioned in the predetermined attitude by the lens positioning mechanism.

An eleventh aspect of the present invention is a method for producing a lens member including:
- a step of biasing a lens member to a side of a first surface via an auxiliary tool attached to a second surface of the lens member having the first surface, which is a convex optical surface, and the second surface, which is an optical surface facing the first surface;
- a step of regulating a position of a predetermined portion by abutment with the predetermined portion on the first surface of the biased lens member and positioning the lens member in a predetermined attitude; and
- a step of performing a predetermined process on the first surface of the lens member positioned in the predetermined attitude.

Advantageous Effects of Invention

According to the present invention, the positioning of the lens member having the convex optical surface can be easily and highly precisely performed.

BRIEF DESCRIPTION OF DRAWINGS

FIG. 3 is a flowchart illustrating an example of a producing procedure of the spectacle lens according to the embodiment of the present invention.

FIGS. 11A and 11B are partially enlarged views illustrating one specific example of a pattern in the spectacle lens according to the embodiment of the present invention in which FIG. 11A is a view illustrating microscopic observation results of the pattern according to the present embodiment, and FIG. 11B is a view illustrating microscopic observation results of a pattern obtained by using an inkjet recording method as a comparative example.

DESCRIPTION OF EMBODIMENTS

Hereinafter, an embodiment of the present invention will be described in detail with reference to the drawings.

(1) Schematic Configuration of Spectacle Lens

First, a spectacle lens will be taken as an example of a lens member to be handled in the present embodiment, and its schematic configuration will be described.

Figure 1:
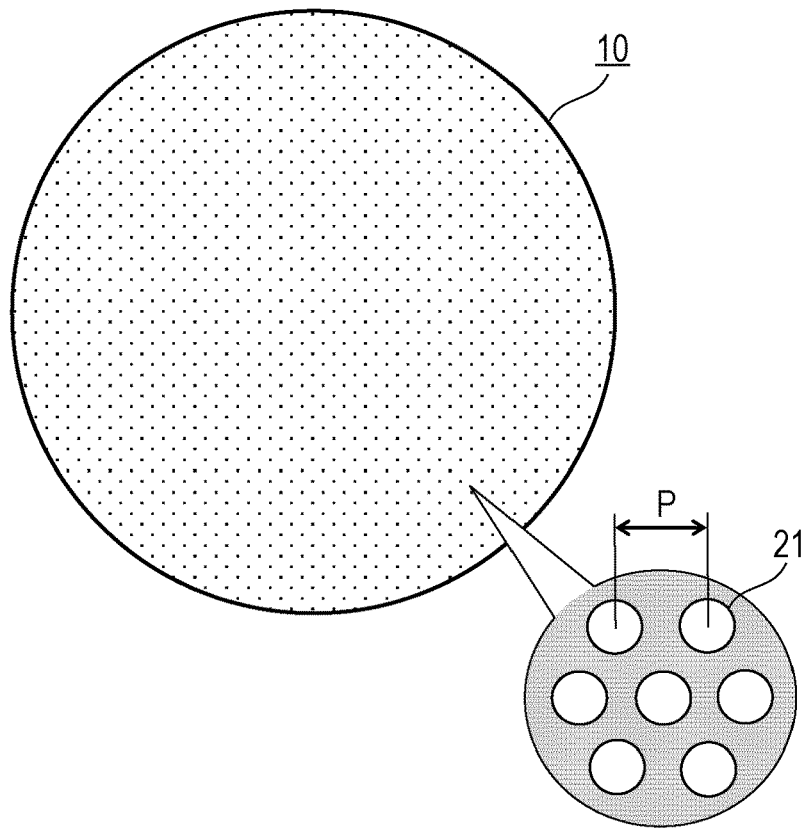
FIG. 1 is a plan view illustrating a configuration example of a spectacle lens according to an embodiment of the present invention.
Figure 2:
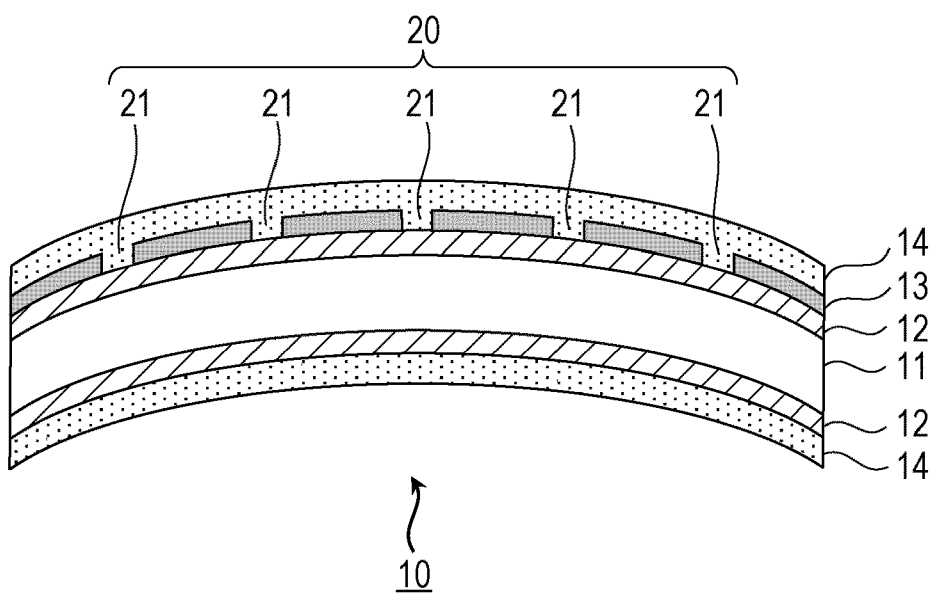
FIG. 2 is a cross-sectional view illustrating a configuration example of the spectacle lens according to the embodiment of the present invention.

FIG. 1 is a plan view illustrating a configuration example of the spectacle lens taken as an example in the present embodiment, and FIG. 2 is a cross-sectional view thereof.

(Overall Configuration)

A spectacle lens 10 has an object-side surface and an eyeball-side surface as optical surfaces. The "object-side surface" is a surface located on an object side when spectacles provided with the spectacle lens 10 are worn by a wearer. The "eyeball-side surface" is a surface opposite thereto, that is, located on an eyeball side when the spectacles provided with the spectacle lens 10 are worn by the wearer. In general, the object-side surface is a convex surface, and the eyeball-side surface is a concave surface, that is, the spectacle lens 10 is generally a meniscus lens.

Hereinafter, the object-side surface of the spectacle lens 10 is also referred to as a "first surface", and the eyeball-side surface is also referred to as a "second surface".

In such a case, the spectacle lens 10 has the first surface which is a convex optical surface and the second surface which is an optical surface facing the first surface.

In the spectacle lens 10 of the present embodiment, a plurality of fine dots 21 are isotropically and uniformly arranged on at least one of the first surface and the second surface, and a predetermined pattern is formed by the dots 21 as illustrated in FIG. 1. Although an example in which the predetermined pattern is formed on the entire surface of the spectacle lens 10 is illustrated in the present embodiment, the predetermined pattern may be partially formed. Further, the predetermined pattern may be formed of, for example, a character, a figure, or the like, instead of being formed of the plurality of dots 21.

Each of the plurality of dots 21 forming the predetermined pattern is formed in the identical shape (for example, a circular shape). The expression that these dots 21 are "isotropically and uniformly arranged" means that the adjacent dots 21 are arranged at a constant pitch P.

As illustrated in FIG. 2, the spectacle lens 10 having such a predetermined pattern includes: a lens substrate 11 which is an optical substrate; hard coat films (HC film) 12 formed on both surface sides (that is, each first surface side and the second surface) of the lens substrate 11; a patterning thin film 13 formed on the HC film 12 on a side of one surface (specifically, the first surface); and antireflection films (AR film) 14 formed on both surface sides. Here, the case where the patterning thin film 13 is arranged on the first surface side is taken as an example, but it is sufficient that the patterning thin film 13 is arranged on at least one surface without being limited thereto. Further, the spectacle lens 10 may have other films formed in addition to the HC films 12, the patterning thin film 13, and the AR films 14.

(Lens Substrate)

The lens substrate 11 is made of a general resin material used for an optical lens and is molded into a predetermined lens shape. The predetermined lens shape may form any of a single focus lens, a multifocal lens, a progressive addition lens, or the like.

As the resin material forming the lens substrate 11, for example, a resin material having a refractive index (nD) of about 1.50 to 1.74 is used. Examples of such a resin material include allyl diglycol carbonate, urethane resin, polycarbonate, thiourethane resin, and episulfide resin. Note that the lens substrate 11 may be made of other resin material capable of obtaining a desired refractive index, or may be made of inorganic glass, instead of the resin materials described above.

(HC Film)

The HC film 12 is formed of, for example, a curable material containing a silicon compound, and is a film formed with a thickness of about 3 μm to 4 μm. A refractive index (nD) of the HC film 12 is close to the refractive index of the material of the lens substrate 11 described above and is, for example, about 1.49 to 1.74, and the film configuration is selected according to the material of the lens substrate 11. The durability of the spectacle lens 10 can be improved by such coating with the HC film 12.

(Patterning Thin Film)

The patterning thin film 13 is formed on the optical surface of the lens substrate 11 with the HC film 12 interposed therebetween, and thus, is formed by a thin film having a thickness of several nm to several tens of nm, for example. As a material forming the patterning thin film 13, for example, metal or metal oxide having a property of absorbing laser light, which will be described later, is used. That is, the patterning thin film 13 is a metal oxide film or a metal film having absorption. Examples of such a film include a film containing at least one type of metal or metal oxide selected from chromium (Cr), tantalum (Ta), niobium (Nb), titanium (Ti), zirconium (Zr), gold (Au), silver (Ag), tin (Sn), and aluminum (Al), and a tin dioxide ($SnO_2$) film or a Cr film is preferably used. In the following description, the case where the patterning thin film 13 is the $SnO_2$ film or the Cr film is mainly given as an example.

Further, the patterning thin film 13 has a pattern 20 formed by partially removing the thin film. The pattern 20 forms the above-described predetermined pattern. Specifically, the pattern 20 is formed by arranging a plurality of identically shaped portions 21. The identically shaped portions 21 are formed by partial removal of the thin film, and corresponds to the above-described dots 21.

That is, in the present embodiment, the pattern 20 forms a dot pattern which is the predetermined pattern, and the identically shaped portions 21 form the dots 21 in the dot pattern.

(AR Film)

The AR film 14 has a multilayer structure in which films having different refractive indexes are layered, and is a film that prevents light reflection by interference action. However, the multilayer structure is not necessarily adopted, and a single-layer structure may be adopted as long as the light reflection prevention effect can be obtained.

When the AR film 14 has the multilayer structure having a low-refractive-index layer and a high-refractive-index layer, a low-refractive-index film is made of, for example, silicon dioxide ($SiO_2$) having a refractive index of about 1.43 to 1.47. Further, a high-refractive-index film is made of a material having a higher refractive index than the low-refractive-index film, and is formed using metal oxides, for example, niobium oxide ($Nb_2O_5$), tantalum oxide ($Ta_2O_5$), titanium oxide ($TiO_2$), zirconium oxide ($ZrO_2$), and yttrium oxide ($Y_2O_3$), aluminum oxide ($Al_2O_3$), and the like in a proper rate.

The visibility of an image through the spectacle lens 10 can be improved by such coating with the AR film 14.

(Basic Producing Procedure)

The spectacle lens 10 having the above-described configuration is produced by a procedure to be described below.

FIG. 3 is a flowchart illustrating an example of the producing procedure of the spectacle lens according to the embodiment of the present invention.

When producing the spectacle lens 10, first, the lens substrate 11, which is the optical substrate, is prepared as a first step (step 101, hereinafter the step is abbreviated as "S").

Then, after the lens substrate 11 is prepared, a step of forming the HC film 12 on both surface sides of the lens substrate 11 is subsequently performed as a second step (S102). The HC film 12 may be formed by, for example, a dipping method using a solution in which a curable material containing a silicon compound is dissolved.

After the formation of the HC film 12, next, a step of forming a thin film 13a of a $SnO_2$ film or a Cr film, which is to serve as the patterning thin film 13, on the optical surface of the lens substrate 11 with the HC film 12 interposed therebetween is performed as a third step (S103). Specifically, the thin film 13a of the $SnO_2$ film or Cr film is formed on the HC film 12 on the side of the convex surface which is the first surface. Such formation of the thin film 13a may be performed by, for example, vacuum deposition or sputtering.

After the formation of the thin film 13a, next, a step of partially removing the thin film 13a to form the pattern 20 is performed as a fourth step (S104). That is, patterning of the thin film 13a is performed by partially removing the thin film 13a. When the patterning of the thin film 13a is performed, the patterning thin film 13 having the pattern 20 is formed on the HC film 12 on the convex surface side.

As a technique for the patterning, for example, there is known a technique of forming a resist pattern is formed on the optical surface by an inkjet recording method and performing the patterning using the resist pattern. However, since the optical surface of the spectacle lens 10 is curved, there is a possibility that the resist pattern is not precisely formed on the optical surface in the resist pattern formation using the inkjet recording method, and as a result, it is difficult to perform highly accurate patterning. Therefore, the patterning for obtaining the predetermined pattern (that is, the pattern 20) is performed by laser processing using laser light irradiation in the present embodiment. Specifically, when forming the pattern 20, only a portion of the thin film 13a that needs to be removed is selectively irradiated with laser light, and the energy of the laser light is used to partially remove the thin film 13a.

If the patterning is performed using such irradiation of laser light, it is possible to improve the accuracy of the patterning. Moreover, since the thin film 13a can be directly patterned using the laser light, it is possible to omit the formation and removal of the resist pattern.

Then, after the formation of the patterning thin film 13, a step of cleaning for removing residues and deposits (foreign substances) during the patterning is performed as a fifth step (S105).

Thereafter, a step of forming the AR film 14 on each of the side of the convex surface, which is the first surface, and the side of the concave surface, which is the second surface, is performed as a sixth step (S106). When the AR film 14 has the multilayer structure, the low-refractive-index layer and high-refractive-index layer are alternately layered and formed in order from the lower layer side. This film formation may be performed by applying, for example, ion-assisted deposition.

(2) Findings of Inventor

As described above, the patterning is performed on the thin film 13a on the convex surface side by the laser processing using the laser light irradiation when producing the spectacle lens 10. It is desirable to perform the patterning with high accuracy. In order to improve the accuracy of the patterning, it is advantageous to irradiate a surface to be processed with laser light using a laser processing machine that supports three-dimensional control of a focal position of the laser light.

As the laser processing machine, used is a laser processing machine including: a laser oscillator which oscillates laser light; a laser optical system which collects the laser light from the laser oscillator and emits the collected laser light; a lens holding unit to which an object to be processed (in the present embodiment, the lens substrate 11 after formation of the HC film 12 and the thin film 13a) that is irradiated with laser light is fixed. A laser processing machine in which a laser oscillator and a laser optical system are integrated to form a laser head may be used. In the laser processing machine having such a configuration, "supporting the three-dimensional control of the focal position of laser light" means that it is possible to change the focal position of the laser light with which the object to be processed is irradiated not only in the XY direction along the in-plane of the irradiated surface but also in the Z direction along an optical-axis direction of the laser light by at least one of movement of the relative position between the laser optical system and the object to be processed and optical path adjustment by the laser optical system, and it is possible to control a mode of the change.

In the case of supporting the three-dimensional control, positioning of the optical surface, which is a surface to be processed, is indispensable. However, the optical surface, which is the surface to be processed for the patterning, is curved in the case of the spectacle lens 10. In particular, the patterned is performed on the first surface (the object-side surface), which is a convex curved surface, by laser irradiation in the present embodiment. Moreover, the curvature (curve) of the first surface sometimes differs depending on a lens. Therefore, when the optical surface is the convex curved surface, it is not always easy to accurately perform the positioning of the optical surface. A reason thereof will be described hereinafter with specific examples.

Figure 4A:
FIGS. 4A-4C are explanatory views illustrating examples of the spectacle lens, which is an object to be processed, in the embodiment of the present invention.
Figure 4B:
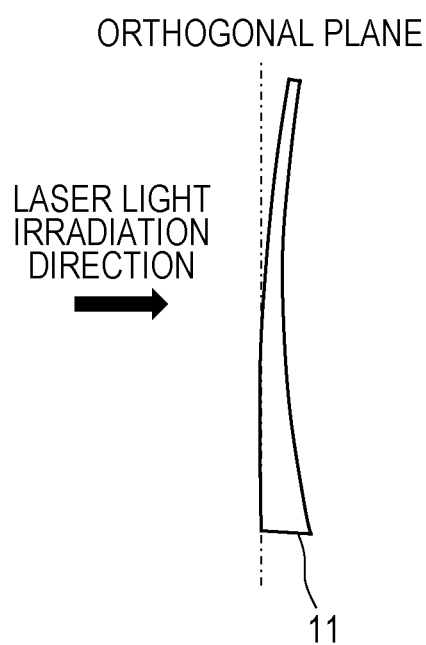
Figure 4C:
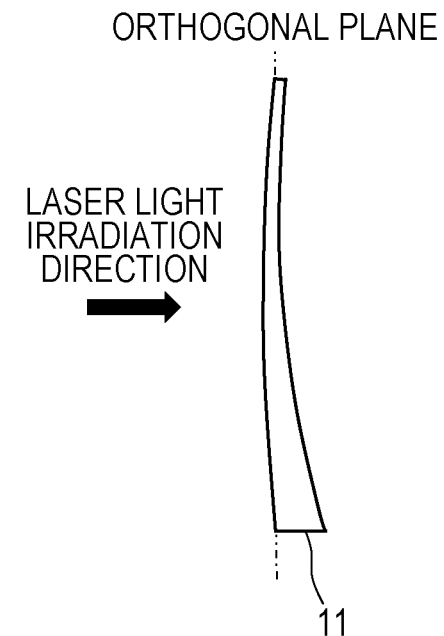

FIGS. 4A-4C are explanatory views illustrating examples of the spectacle lens, which is an object to be processed, in the present embodiment.

The illustrated example illustrates a case where the spectacle lens 10 is a prism lens. The prism lens is the spectacle lens 10 having a prism prescription. In the case of the prism lens, the lens substrate 11 is configured such that the first surface (object-side surface), which is the convex curved surface, and the second surface (eyeball-side surface), which is a concave curved surface, face each other with a prism amount.

For example, as illustrated in FIG. 4A, it is conceivable to perform the positioning of the spectacle lens 10 using an edge position on the second surface of the lens substrate 11 as a reference. Specifically, the lens substrate 11 is placed on a smooth surface in a state where the second surface side faces downward, thereby performing the positioning such that the edge position is arranged along the horizontal line using the edge position of the second surface, which is the concave curved surface, as the reference.

Meanwhile, when the spectacle lens 10 is the prism lens, the first surface, which is the surface to be processed for patterning, is arranged so as to be tilted by the prism amount with respect to a surface orthogonal to the irradiation direction of the laser light (see an orthogonal surface in the drawing) as illustrated in FIG. 4B if the positioning is performed using to the edge position of the second surface as the reference. In such an arrangement state, it is difficult to say that the positioning of the first surface, which is the surface to be processed, can be accurately performed, and thus, there is a possibility that it is difficult to precisely perform the three-dimensional control of the focal position of the laser light. Further, it is conceivable to perform data correction or the like in consideration of the prism amount in order to precisely perform the three-dimensional control. In such a case, however, the processing becomes complicated due to the precise control.

That is, in order to improve the accuracy of the patterning of the optical surface while suppressing the complicated processing, it is desirable to perform the positioning using the convex first surface, which is the surface to be processed for patterning, as a reference and perform the patterning on the first surface by laser irradiation in a state where the edge position of the first surface is arranged along the plane orthogonal to the irradiation direction of the laser light (see the orthogonal plane in the drawing) as illustrated in FIG. 4C. Moreover, desirably, the positioning using the first surface as the reference can be performed easily and highly accurately regardless of whether or not the spectacle lens 10 is the prism lens and regardless of the curvature (curve) of the first surface of the spectacle lens 10.

Based on the above, the inventor of the present application has come up with a lens positioning mechanism to be described below as a result of repeated diligent studies.

(3) Specific Example of Lens Positioning Mechanism

Next, one specific example of the lens positioning mechanism according to the present embodiment will be described.

Figure 5:
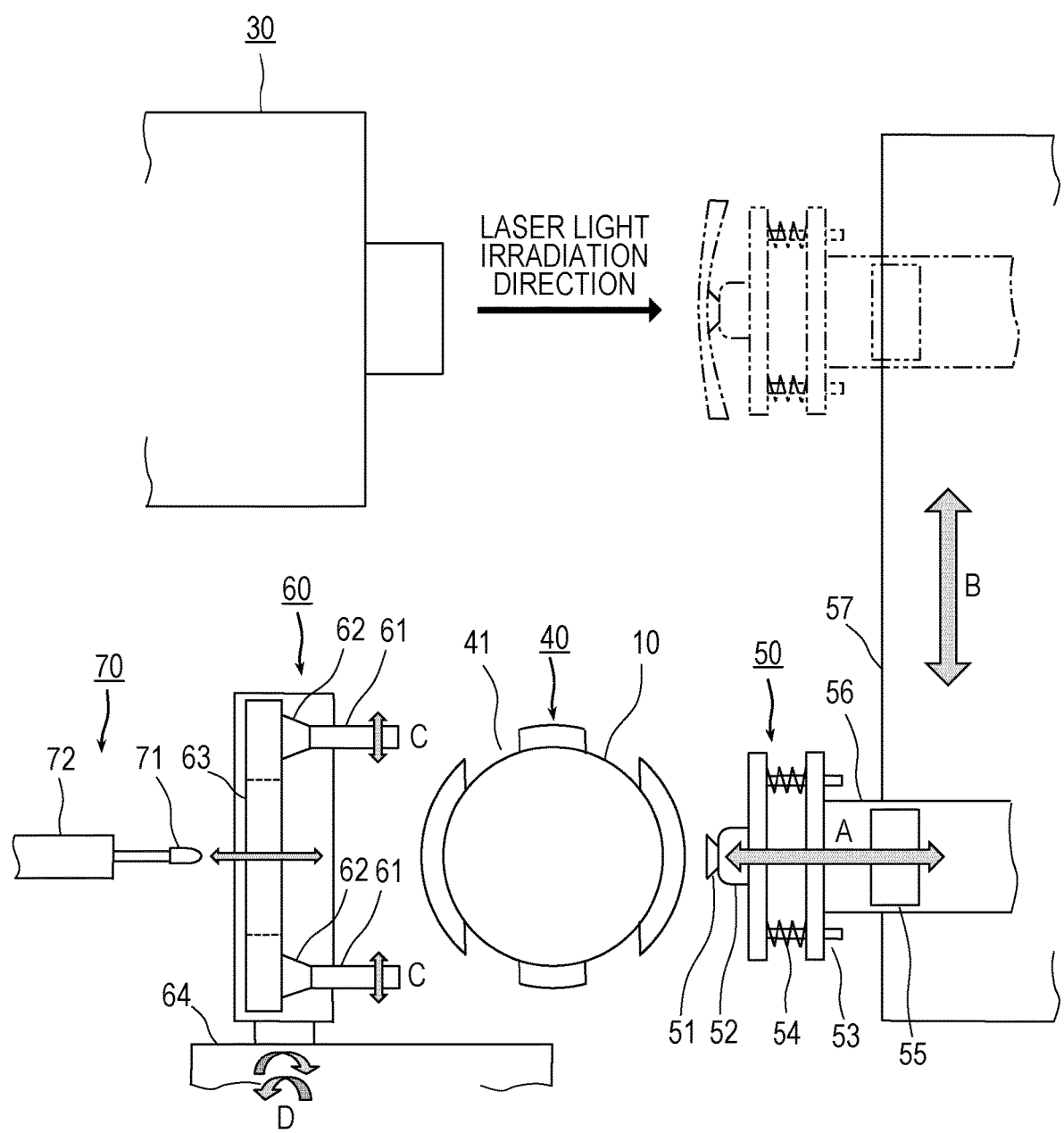
FIG. 5 is a plan view illustrating a schematic configuration example of one specific example of a lens positioning mechanism according to the embodiment of the present invention.

FIG. 5 is a plan view illustrating a schematic configuration example of the specific example of the lens positioning mechanism according to the present embodiment.

(Overall Configuration)

The lens positioning mechanism in the present embodiment is installed in parallel with a laser processing machine 30, and include a lens mounting base 40, a member holding unit 50, an attitude control unit 60, a sensor unit 70, and a controller (not illustrated) when being roughly classified.

(Lens Mounting Base)

The lens mounting base 40 allows the spectacle lens 10, which is the object to be processed for patterning by the laser processing machine 30, to be set thereon, and has a smooth flat surface (that is, a lens mounting surface) on which the second surface of the spectacle lens 10 is mounted. Note that the object to be processed is exactly the lens substrate 11 after the formation of the HC film 12 and the thin film 13a in the present embodiment, but the object to be processed is simply referred to as the spectacle lens 10 for the sake of simplicity in the following description. The spectacle lens 10 set on the lens mounting base 40 is gripped by support claws 61 of the attitude control unit 60 as will be described later. Therefore, the lens mounting base 40 is formed with a notch 41 configured to avoid interference with the support claws 61 of the attitude control unit 60. Further, the lens mounting base 40 is configured such that the lens mounting surface can be raised and lowered.

(Member Holding Unit)

The member holding unit 50 is configured to hold the second surface of the spectacle lens 10 which is the object to be processed. Therefore, the member holding unit 50 has a pad 51 that holds the second surface of the spectacle lens 10 by vacuum suction, and a joint 52 that swingably supports the pad 51. Then, the joint 52 is configured to be capable of switching between a movable state and a fixed state of the swinging portion. The switching of the state may be realized by using, for example, a mechanism that performs transition between the fixed state in which the swinging portion is locked and a state in which the swinging portion is not fixed and can move freely, as necessary, while utilizing the presence or absence of the vacuum suction. If the pad 51 is supported via such a joint 52, the pad 51 can follow a shape of the second surface of the spectacle lens 10 in the movable state. Further, it is possible to maintain an attitude of the spectacle lens 10 held by the pad 51 in the fixed state.

Further, the member holding unit 50 has a function of biasing the held spectacle lens 10 from the second surface side toward the first surface side as well as the function of holding the spectacle lens 10. Therefore, the member holding unit 50 includes a slide mechanism 53 that moves the pad 51 and the joint 52 along the biasing direction, and an elastic member 54 that stretches and contracts along the biasing direction. The illustrated example illustrates a case where the elastic member 54 is a compression coil spring. With such a configuration, the elastic member 54 of the member holding unit 50 bends when an external force is applied from the first surface side to the second surface side of the held spectacle lens 10, and a reaction force of the elastic member 54 biases the spectacle lens 10 from the second surface side to the first surface side when the external force is mitigated or eliminated.

Further, the member holding unit 50 has a brake 55 that maintains the bent state of the elastic member 54. The brake 55 may be configured using, for example, an electromagnetic brake. With such a configuration, the member holding unit 50 can stop the movement of the slide mechanism 53 at an arbitrary position and maintain the stopped state regardless of the magnitude of the reaction force of the elastic member 54

Furthermore, the member holding unit 50 includes a first electric actuator 56 that integrally moves the pad 51, the joint 52, the slide mechanism 53, and the elastic member 54 in a direction along the biasing direction of the spectacle lens 10 (see the arrow A in the drawing), and a second electric actuator 57 that integrally moves the pad 51, the joint 52, the slide mechanism 53, and the elastic member 54 in a direction orthogonal to the direction (see the arrow B in the drawing). That is, the member holding unit 50 has a function as an orthogonal biaxial robot that moves the spectacle lens 10 held by the pad 51.

Note that the member holding unit 50 is configured to hold the spectacle lens 10 in the state of being erected in the vertical direction. The state of being erected in the vertical direction refers to a state where the optical surface of the spectacle lens 10 is arranged along the vertical direction, particularly refers to a state where the edge position of the first surface of the spectacle lens 10 is arranged along the vertical direction in the present embodiment.

(Attitude Control Unit)

The attitude control unit 60 is configured to position the spectacle lens 10 in a predetermined attitude. The predetermined attitude refers to, for example, an attitude positioned using the first surface of the spectacle lens 10 as a reference, and particularly refers to an attitude positioned in a state where the edge position of the first surface of the spectacle lens 10 is arranged along the vertical direction in the present embodiment.

In order for the positioning in the predetermined attitude, the attitude control unit 60 is configured to regulate edge positions of a plurality of portions on the first surface of the spectacle lens 10 biased by the member holding unit 50. More specifically, the attitude control unit 60 has the plurality of (three or more, for example, four) pin-shaped support claws 61 arranged so as to correspond to the plurality of portions, respectively, and tapered portions 62 are provided for the respective support claws 61. The tapered portions 62 are formed so as to spread in the biasing direction of the spectacle lens 10. Then, the movement of the edge position in the biasing direction is regulated as the edge position of the first surface of the spectacle lens 10 abuts on the tapered portion 62 arranged on one end side of the support claw 61. Note that details of the attitude control of the spectacle lens 10 by the attitude control unit 60 will be described later.

Further, the attitude control unit 60 has a claw drive unit 63 that moves the plurality of support claws 61 in a direction orthogonal to a pin-axis direction (see the arrow C in the drawing) to switch between a gripped state and a non-gripped state of the spectacle lens 10 by the respective support claws 61. The claw drive unit 63 may be configured using, for example, an electric actuator. As the claw drive unit 63 moves the respective support claws 61 to grip the spectacle lens 10, the attitude control unit 60 can lift and move the spectacle lens 10 mounted on the lens mounting base 40.

Furthermore, the attitude control unit 60 has a claw rotation unit 64 that integrally moves the support claw 61, the tapered portion 62, and the claw drive unit 63 in a direction of rotating these parts (see the arrow D in the drawing). The claw rotation unit 64 may also be configured using, for example, an electric actuator, which is similar to the claw drive unit 63. As the claw rotation unit 64 moves the support claw 61 and the like, the spectacle lens 10 gripped by the support claws 61 can transition between the state of being set in the horizontal direction on the lens mounting base 40 and the state of being erected in the vertical direction.

(Sensor Unit)

The sensor unit 70 measures a relative position of a predetermined point on the first surface of the spectacle lens 10 with respect to a regulation position when positioned by the attitude control unit 60. Examples of the predetermined point on the first surface include an apex position of the first surface which is the convex curved surface. In order to measure a position of such a predetermined point, the sensor unit 70 has a contact 71 that abuts on the predetermined point and a movement mechanism 72 that moves a position of the contact 71. Then, the relative position of the predetermined point (for example, the apex position of the first surface) with respect to the regulation position (that is, the edge position of the first surface) of the spectacle lens 10 by the attitude control unit 60 is measured by recognizing the position of the contact 71 when abutting on the predetermined point. Note that the sensor unit 70 is not necessarily a contact type as in the present embodiment, but may be a non-contact type using, for example, a laser length-measurement sensor or the like as long as the position of the first surface of the spectacle lens 10 can be measured.

(Controller)

The controller controls the operation of each of the above-described parts 40 to 70. Specifically, the controller is configured to control a lifting/lowering operation of the lens mounting surface on the lens mounting base 40, a vacuum suction operation and operations of the first electric actuator 56, the second electric actuator 57, and the brake 55 in the member holding unit 50, and operations of the claw drive unit 63 and the claw rotation unit 64 in the attitude control unit 60. Further, the controller is configured to acquire a measurement result obtained by the sensor unit 70, perform data processing on the measurement result as necessary, and then, notify the laser processing machine 30 of such a data processing result.

Such a controller may be configured using, for example, a computer device that executes a predetermined program.

(4) Procedure of Lens Positioning Method

Next, a procedure of a lens positioning method performed using the lens positioning mechanism having the above-described configuration will be described. Note that it is assumed that a processing operation of each part to be described below is controlled by the controller.

FIGS. 6 to 9 are explanatory views schematically illustrating an outline of one procedure (process) in the lens positioning method according to the present embodiment.

Figure 6:
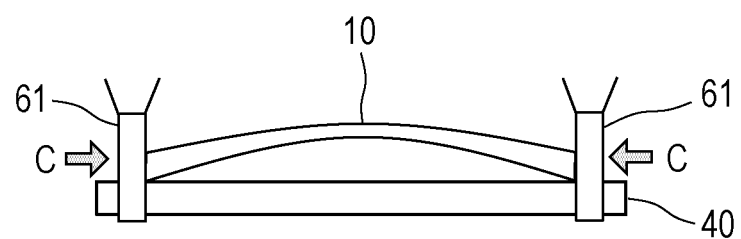
FIG. 6 is an explanatory view (Part 1) schematically illustrating an outline of one procedure (process) in a lens positioning method according to the embodiment of the present invention.

When positioning the lens, first, the spectacle lens 10, which is the object to be processed, is mounted on the lens mounting surface of the lens mounting base 40 in the state where the second surface side of the spectacle lens 10 faces downward as illustrated in FIG. 6. It is conceivable to mount the spectacle lens 10 using a transfer robot, but the spectacle lens 10 may be mounted by being held by the operator's hand. Then, after the mounting on the lens mounting surface, the claw drive unit 63 of the attitude control unit 60 moves the respective support claws 61 (see the arrow C in the drawing), and grips the edge of the spectacle lens 10 by the respective support claws 61. At this time, the respective support claws 61 do not interfere with the lens mounting base 40 since the notch 41 is formed in the lens mounting base 40.

Note that, for example, when the claw drive unit 63 is configured using an electric actuator and the claw drive unit 63 has a function of recognizing positions of the respective support claws 61, it is possible to measure a diameter of the gripped spectacle lens 10 by gripping the edge of the spectacle lens 10 with the respective support claws 61.

Figure 7:
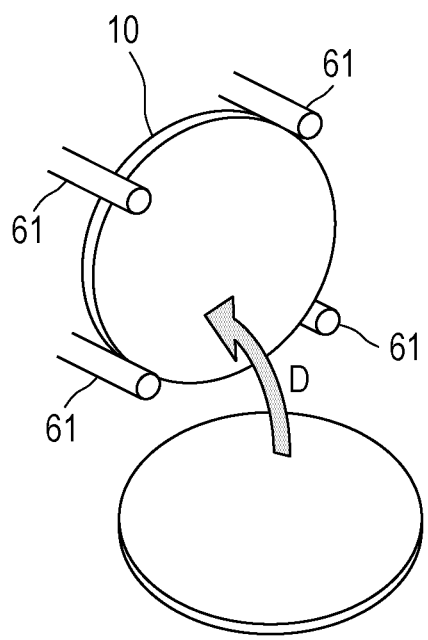
FIG. 7 is an explanatory view (Part 2) schematically illustrating the outline of one procedure (process) in the lens positioning method according to the embodiment of the present invention.

After gripping the spectacle lens 10 with the respective support claws 61, next, the claw rotation unit 64 of the attitude control unit 60 is operated in the state where the respective support claws 61 grip the spectacle lens 10 (see the arrow D in the drawing) as illustrated in FIG. 7 while retracting the lens mounting surface of the lens mounting base 40 by lowering. As a result, the spectacle lens 10 is gripped by the respective support claws 61 in the state of being erected in the vertical direction.

Figure 8:
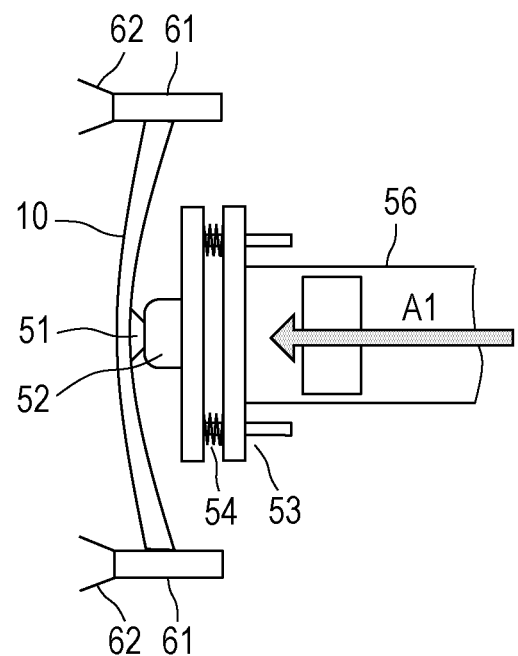
FIG. 8 is an explanatory view (Part 3) schematically illustrating the outline of one procedure (process) in the lens positioning method according to the embodiment of the present invention.

Thereafter, as illustrated in FIG. 8, the first electric actuator 56 in the member holding unit 50 is operated to integrally move the pad 51, the joint 52, the slide mechanism 53, and the elastic member 54 (see the arrow A1 in the drawing) such that the pad 51 abuts on the second surface of the spectacle lens 10. After the pad 51 abuts on the second surface of the spectacle lens 10, the slide mechanism 53 operates to obtain the bent state of the elastic member 54 if the first electric actuator 56 is further operated. As a result, even when the pad 51 abuts on the second surface of the spectacle lens 10, it is unnecessary to control a moving stroke of the first electric actuator 56 more precisely than necessary, and the spectacle lens 10 is not overloaded.

Further, at this time, the pad 51 that abuts on the second surface of the spectacle lens 10 is supported via the joint 52, and thus, the pad 51 can follow the shape of the second surface of the spectacle lens 10 if the joint 52 is in the movable state.

Figure 9:
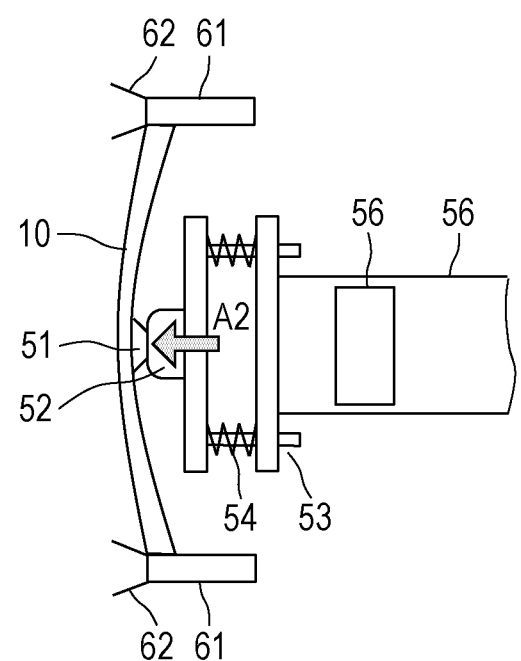
FIG. 9 is an explanatory view (Part 4) schematically illustrating the outline of one procedure (process) in the lens positioning method according to the embodiment of the present invention.

After the pad 51 abuts on the second surface of the spectacle lens 10 and the elastic member 54 is in the bent state, the spectacle lens 10 is temporarily held by vacuum suction on the pad 51 (that is, vacuum suction is performed but the pad 51 is in a swingable state), and the claw drive unit 63 moves the respective support claws 61 such that the distance between the respective support claws 61 that grip the spectacle lens 10 is slightly widened (for example, by about 0.05 mm to 0.1 mm). Then, a gripping force of each of the support claws 61 is weakened, so that the spectacle lens 10 is biased from the second surface side toward the first surface side due to the reaction force that the elastic member 54 tries to stretch while remaining in the state of being temporarily held by the pad 51 as illustrated in FIG. 9, and is moved to the second surface side so as to be guided by the respective support claws 61 (see the arrow A2 in the drawing). Then, when the edge position of the first surface of the spectacle lens 10 reaches the tapered portion 62, the spectacle lens 10 abuts on the tapered portion 62, and does not move any further. That is, in the spectacle lens 10, edge positions of a plurality of portions (that is, portions to be gripped by the plurality of support claws 61) on the first surface are regulated by the tapered portion 62 of the attitude control unit 60.

After the edge position of the first surface is regulated by the tapered portion 62, the claw drive unit 63 moves the respective support claws 61 in a direction of narrowing the distance between the respective support claws 61. Then, the spectacle lens 10 is gripped by the respective support claws 61 in a state where the edge positions of the plurality of portions (that is, portions to be gripped by the plurality of support claws 61) on the first surface are located at boundaries between the support claws 61 and the tapered portion 62. That is, the spectacle lens 10 is positioned using the first surface as the reference such that the edge position of the first surface is located at the boundary between the support claw 61 and the tapered portion 62. At this time, it is assumed that the temporary holding of the spectacle lens 10 by the pad 51 is released.

Here, the sensor unit 70 measures the relative position of the predetermined point (for example, the apex position of the first surface) on the first surface of the spectacle lens 10 with respect to the regulation position when positioned by the attitude control unit 60. Specifically, the movement mechanism 72 moves the position of the contact 71 until the contact 71 abuts on the first surface of the spectacle lens 10 to recognize the position of the contact 71 (specifically, the amount of movement to an abutment position) when abutting on the first surface. At this time, a distance value to a boundary position between the support claw 61 and the tapered portion 62 (that is, the edge position of the first surface of the spectacle lens 10) in the attitude control unit 60 is a known fixed value for the sensor unit 70. Therefore, if the abutment position of the contact 71 is known, it is possible to identify the protruding amount of the apex position of the first surface with respect to the edge position of the first surface.

In this manner, the sensor unit 70 can identify the protruding amount of the apex position regarding the first surface of the spectacle lens 10. Further, the claw drive unit 63 of the attitude control unit 60 can measure the diameter of the gripped spectacle lens 10 as described above. Therefore, for example, if the first surface of the spectacle lens 10 is spherical, the controller can recognize three-dimensional shape data of a surface shape forming the first surface of the positioned spectacle lens 10 based on notification information from the attitude control unit 60 and the sensor unit 70. The recognized surface shape data is transmitted from the controller to the laser processing machine 30 and is utilized by the laser processing machine 30, for example, as will be described later.

Thereafter, the second surface of the positioned spectacle lens 10 is subjected to vacuum suction by the pad 51, and the joint 52 that supports the pad 51 is switched to the fixed state. Furthermore, the brake 55 stops the movement of the slide mechanism 53 such that the elastic member 54 maintains the bent state. As a result, the spectacle lens 10 is held by the member holding unit 50 while maintaining the attitude positioned using the first surface as the reference.

When the member holding unit 50 holds the spectacle lens 10, the attitude control unit 60 causes the claw drive unit 63 to move the respective support claws 61 in the direction in which the distance between the respective support claws 61 is widened, thereby releasing the gripping of the spectacle lens 10 by the respective support claws 61. Even if the gripping is released, the spectacle lens 10 is maintained in the attitude positioned using the first surface as the reference by being held by the member holding unit 50.

Then, the member holding unit 50 operates the first electric actuator 56 such that the spectacle lens 10 moves in a direction of being away from the attitude control unit 60 while keeping the state of holding the spectacle lens 10, and operates the second electric actuator 57 so as to move the spectacle lens 10 up to a position where the laser processing machine 30 can perform laser processing on the spectacle lens 10. Even if the spectacle lens 10 is moved to the position where the laser processing can be performed, the spectacle lens 10 is maintained in the attitude positioned using the first surface as the reference by being held by the member holding unit 50. Moreover, since the elastic member 54 is maintained in the bent state by the brake 55, it is possible to easily and appropriately control the movement of the spectacle lens 10 to the position where the laser processing can be performed without requiring the complicated processing. That is, the elastic member 54 remains in the bent state even if the regulation by the tapered portion 62 is released, and thus, the spectacle lens 10 can be accurately moved to a desired position only by controlling the operations of the first electric actuator 56 and the second electric actuator 57 without requiring complicated position correction processing to reflect the stretching amount of the elastic member 54.

When moved to the position where the laser processing can be performed, the spectacle lens 10 is subjected to the laser processing by the laser processing machine 30 based on the three-dimensional shape data recognized for the first surface while being maintained in the attitude positioned with respect to the first surface as will be described in detail later. That is, the laser processing machine 30 functions as a lens processing unit that performs the laser processing, which is a predetermined process, on the first surface of the spectacle lens 10 positioned in the predetermined attitude by the lens positioning mechanism according to the present embodiment.

(5) Another Specific Example of Lens Positioning Mechanism

The above-described one specific example of the lens positioning mechanism assumes a case where an outer shape of the spectacle lens is circular. However, there may be a spectacle lens, which is an object to be processed, having a so-called edged shape, other than the one having the circular outer shape. Further, there may be a spectacle lens that has been subjected to cutting or polishing for lens thinning, prism prescription, or the like. Such a spectacle lens that has been subjected to at least one of cutting and polishing, represented by the spectacle lens that has been edged, is hereinafter referred to as an "irregular-shaped lens".

The irregular-shaped lens is likely to have a portion where an edge portion becomes sharp due to the influence of cutting and polishing, for example, and thus, it is not always appropriate to perform positioning using an edge position of a first surface of the irregular-shaped lens as a reference. Therefore, a lens positioning mechanism capable of appropriately positioning when the spectacle lens, which is the object to be processed, is the irregular-shaped lens will be described below as another specific example different from the above-described one specific example. Note that only differences from the above-described one specific example will be mainly described in the following description.

In the other specific example described herein, configurations of the member holding unit 50 and the attitude control unit 60 are different from those in the case of the above-described one specific example.

Figure 10:
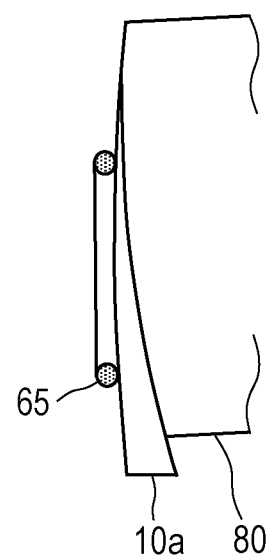
FIG. 10 is a side cross-sectional view illustrating a main configuration example of another specific example of the lens positioning mechanism according to the embodiment of the present invention.

FIG. 10 is a side cross-sectional view illustrating a main configuration example of the other specific example of the lens positioning mechanism according to the embodiment of the present invention.

(Member Holding Unit)

The member holding unit 50 is configured to hold an irregular-shaped lens 10a via an auxiliary tool 80 mounted on a second surface of the irregular-shaped lens 10a which is the object to be processed.

As the auxiliary tool 80, for example, a fixture used in a cutting step, a polishing step, or the like of a spectacle lens can be used. The fixture is attached to a concave surface (that is, the second surface) of the spectacle lens by adhesion action of a low-melting-point metal member called an alloy. However, a jig other than the fixture may be used as the auxiliary tool 80.

It is conceivable to hold the irregular-shaped lens 10a via the auxiliary tool 80 using vacuum suction by the pad 51 similarly to the case of the above-described one specific example. In such a case, the pad 51 performs the vacuum suction on the auxiliary tool 80, instead of the irregular-shaped lens 10a. However, the auxiliary tool 80 may be held by a mechanical clamping operation, for example, without being necessarily limited thereto. In either case, it is assumed that swing and non-swing by the joint 52 is switched.

(Attitude Control Unit)

The attitude control unit 60 is configured to abut on a predetermined portion on the first surface of the irregular-shaped lens 10a to regulate a position of the predetermined portion, and position the irregular-shaped lens 10a in a predetermined attitude. When the object to be processed is the irregular-shaped lens 10a, a portion where an edge portion becomes sharp due to the influence of cutting and polishing, for example, is likely to occur, and thus, it is not always appropriate to perform the positioning using an edge position of the first surface of the irregular-shaped lens as a reference. Therefore, the attitude control unit 60 performs the positioning using the predetermined portion on the first surface as the reference, instead of the edge position of the first surface.

Examples of the predetermined portion as the reference include an annular region on the first surface of the irregular-shaped lens 10a having an apex position of the first surface as the center. In such a case, the attitude control unit 60 is configured to abut on the annular region on the first surface of the irregular-shaped lens 10a to regulate the position. Specifically, a ring-shaped regulating member 65 made of a material that is resistant to a scratch and a contact mark, for example, silicon rubber, a fluororesin member, or the like is arranged instead of the tapered portion 62 described in the above-described one specific example. The regulating member 65 abuts on the first surface of the irregular-shaped lens 10a to regulate the position of the first surface of the irregular-shaped lens 10a. As a result, the irregular-shaped lens 10a is positioned in the predetermined attitude. The predetermined attitude refers to, for example, an attitude positioned using the first surface as the reference, and particularly an attitude positioned in a state where the edge position of the first surface is arranged along the vertical direction in the present embodiment, which is similar to the case of the above-described one specific example.

Note that the predetermined portion as the reference is not necessarily the annular region, and may be, for example, three or more points separated from each other on the first surface having the apex position of the first surface of the irregular-shaped lens 10a as the center. In such a case, the attitude control unit 60 is configured to abut on the three or more points, which are separated from each other, on the first surface of the irregular-shaped lens 10a to regulate the position. Even with such a configuration, the irregular-shaped lens 10a is positioned in the predetermined attitude.

(Procedure for Lens Positioning)

Even in the lens positioning mechanism having the above-described configuration, a procedure for lens positioning is the same as that in the case of the above-described one specific example. Accordingly, the description thereof will be omitted herein.

(6) Effect of Lens Positioning Mechanism According to Present Embodiment

With the lens positioning mechanism according to the present embodiment, the following effect can be obtained in both the case of the above-described one specific example and the case of the other specific example.

In the present embodiment, the spectacle lens 10 or the irregular-shaped lens 10a, which is the object to be processed, can be positioned using the first surface, which is the convex curved surface, as the reference. Then, the positioning using the first surface as the reference can be performed easily and highly accurately regardless of whether or not the spectacle lens 10 or the irregular-shaped lens 10a is the prism lens and regardless of the curvature (curve) of the first surface of the spectacle lens 10 or the irregular-shaped lens 10a.

That is, the positioning of the spectacle lens 10 or the irregular-shaped lens 10a having the convex optical surface can be easily and highly accurately performed according to the present embodiment.

(7) Details of Laser Processing

Next, the laser processing performed by the laser processing machine 30 on the spectacle lens 10 or the irregular-shaped lens 10a will be described in detail with a specific example.

Before the laser processing by the laser processing machine 30, first, the lens positioning mechanism positions the spectacle lens 10 or the irregular-shaped lens 10a (hereinafter collectively referred to as a "lens member") in the predetermined attitude as described above. Then, the controller recognizes the surface shape data of the first surface of the lens member using a dimensional measurement result of the sensor unit 70 for the first surface of the lens member in the state where the lens member is positioned in the predetermined attitude. Thereafter, the first electric actuator 56 and the second electric actuator 57 move the lens member up to a position where the laser processing machine 30 can perform the laser processing on the lens member while maintaining the positioned attitude of the lens member. As a result, the laser processing machine 30 can perform the laser processing on the lens member.

That is, the lens member on which patterning by the laser processing has been performed is obtained through at least a step of positioning the lens member having the first surface which is the convex optical surface and the second surface which is the optical surface facing the convex optical surface in the predetermined attitude, a step of recognizing the surface shape data of the first surface using the dimensional measurement result for the first surface of the positioned lens member, and a step of irradiating the first surface of the lens member with laser light to perform the laser processing on the first surface and controlling an irradiation position of the laser light based on the surface shape data.

Note that the lens member, which is the object to be processed, is kept in the state of being erected in the vertical direction in the case of performing each of these steps. As a result, foreign substances (for example, substances removed by the laser processing) or the like fall in the direction of gravity in any step (particularly the step of performing the laser processing), it is possible to prevent the foreign substances from adhering to the optical surface of the lens member.

Here, the step of performing the laser processing on the first surface of the lens member will be described in more detail.

(Wavelength of Laser Light)

It is desirable that laser light with which the lens member be configured to partially remove the thin film 13a, and not cause damage to the lens substrate 11 and the HC film 12 other than the thin film 13a due to the irradiation. Therefore, laser light having the following wavelength is used for the irradiation of the laser light in the present embodiment.

When a transmittance of the laser light is high, the energy of the laser light is hardly absorbed by a member irradiated with the laser light (that is, the laser light is easily transmitted), so that it is possible to suppress the damage to the member. On the other hand, if the transmittance is low, an absorption rate of the energy of the emitted laser light becomes high, and thus, it is possible to efficiently perform processing or the like using the energy absorption (for example, partial removal of the member). Therefore, if a transmittance difference between layered members is large, it is possible to perform the processing or the like using the laser light on only one member.

Based on this fact, laser light having a wavelength belonging to a wavelength band in which the difference between a transmittance for the lens substrate 11 and a transmittance for the thin film 13a is 1% or more, preferably 3% or more, more preferably 5% or more, and even more preferably 10% or more is used as the laser light to be emitted. Furthermore, in addition to the transmittance for the lens substrate 11, laser light having a wavelength belonging to a wavelength band in which a difference between a transmittance for the HC film 12, which is a non-removal film, and the transmittance for the thin film 13a is 1% or more, preferably 3% or more, more preferably 5% or more, and even more preferably 10% or more is used. Further, laser light having a wavelength belonging to a wavelength band in which a difference between a transmittance for the AR film 14, which is another non-removal film, and the transmittance of the thin film 13a is 1% or more, preferably 3% or more, more preferably 5% or more, and even more preferably 10% or more may be used.

Note that transmittances of the lens substrate 11, the HC film 12, and the AR film 14 referred to herein may include a transmittance of a stack of these parts.

Examples of the wavelength band in which the transmittance difference is 5% or more (that is, a more preferable transmittance difference) include a wavelength band of 380 nm to 1150 nm. Then, in the removal step (S104), for example, laser light having a wavelength of 1064 nm is emitted as the laser light having a wavelength belonging to such a wavelength band. This is because the transmittance difference is 10% or more if the laser light has the wavelength of 1064 nm, and the transmittances for the lens substrate 11 and the HC film 12 are 90% or more, and the influence of the laser light on the lens substrate 11 can be suppressed.

When the transmittance difference is set to at least 1% or more in this manner, it is possible to realize the removal of only the irradiated portion since the thin film 13a has a high absorption rate although the laser light passes through (does not cause damage on) the lens substrate 11, the HC film 12, and the like at the time of emitting the laser light. That is, it is possible to directly perform the patterning on the thin film 13a using the laser irradiation. Further, the direct patterning using the laser irradiation can be ensured if the transmittance difference is preferably 3% or more, more preferably 5% or more, and even more preferably 10% or more.

Note that an upper limit of the transmittance difference is about 50% in consideration of the fact that the lens substrate 11, the HC film 12, the thin film 13a, and the like all have light-transmitting properties.

(Focal Position of Laser Light)

The three-dimensional control of the focal position when irradiating the laser light as described above is performed as follows.

First, the laser processing machine 30 acquires the surface shape data for the first surface of the lens member, which is the object to be processed, from the controller of the lens positioning mechanism. On the other hand, the laser processing machine 30 acquires pattern data for the pattern 20 that needs to be formed on the lens member, which is the object to be processed, from a higher-level device of the laser processing machine 30.

Then, the laser processing machine 30 changes the focal position of laser light in the XY direction according to the acquired pattern data, and also changes the focal position of the laser light in the Z direction according to the acquired surface shape data. In this manner, the laser processing machine 30 performs the three-dimensional control of the focal position of the laser light to be emitted.

The surface shape data of the lens member, which is the basis of such three-dimensional control, is recognized in the lens positioning mechanism in the state where the lens member is positioned in the predetermined attitude using the first surface as the reference. Moreover, the lens member maintains its positioned attitude even in the state of being arranged at the position where the laser processing by the laser processing machine 30 can be performed. Therefore, the laser processing machine 30 can accurately perform the three-dimensional control of the focal position of the laser light.

Further, for example, even when the lens member is a prism lens, the surface shape data is recognized in the state of being positioned using the first surface as the reference. Thus, the three-dimensional control is not affected by the prism amount of the lens member, which is different from a case where the second surface is used as the reference. Therefore, the laser processing machine 30 can precisely perform the three-dimensional control of the focal position of the laser light without requiring data correction or the like in consideration of the prism amount, and can prevent the processing from becoming complicated due to the precise control.

Further, the surface shape data of the lens member is recognized based on the measurement result by the sensor unit 70. Thus, for example, even if the curvature (curve) of the first surface of the lens member is different for each lens member, the difference in curvature is precisely reflected. In this regard as well the laser processing machine 30 can accurately perform the three-dimensional control of the focal position of the laser light.

In other words, as the surface shape data is acquired from the lens positioning mechanism after undergoing the positioning with the lens positioning mechanism, the laser processing machine 30 can easily and highly accurately perform the three-dimensional control of the focal position of the laser light regardless of whether or not the lens member, which is the object to be processed, is the prism lens and regardless of the curvature (curve) of the first surface of the lens member. Therefore, when patterning the first surface of the lens member using the laser processing by the laser processing machine 30, it is possible to improve the accuracy of the patterning while suppressing the complicated processing.

(Specific Example of Patterning)

Here, the pattern 20 in the patterning using the laser processing by the laser processing machine 30 will be described by taking a specific example.

In the following description, a case where a lens member, which is an object to be processed, is a prism lens will be given as an example. The prism lens is a spectacle lens with a prism prescription, and is configured such that a first surface (object-side surface) and a second surface (eyeball-side surface) face each other with a prism amount. Having the prism amount means that the prism amount other than "0" is given.

Even when the object to be processed is the prism lens, the pattern 20 formed on the first surface is formed by laser processing after undergoing positioning using the first surface as the reference as described above. Moreover, the laser processing is performed while supporting the three-dimensional control of the focal position of the laser light based on the surface shape data of the first surface. Therefore, the pattern 20 is patterned with high accuracy, and specifically, is formed with the accuracy to be described below.

Figure 11A:
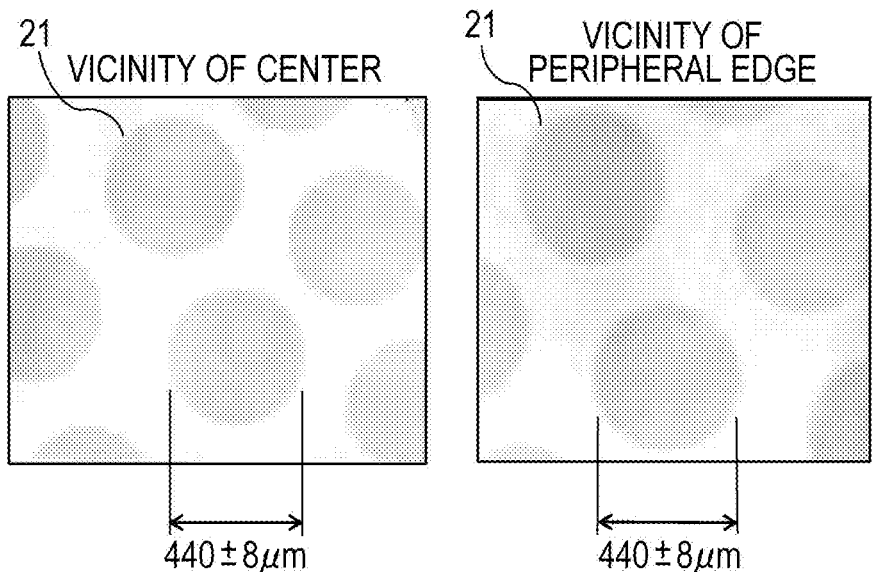
Figure 11B:
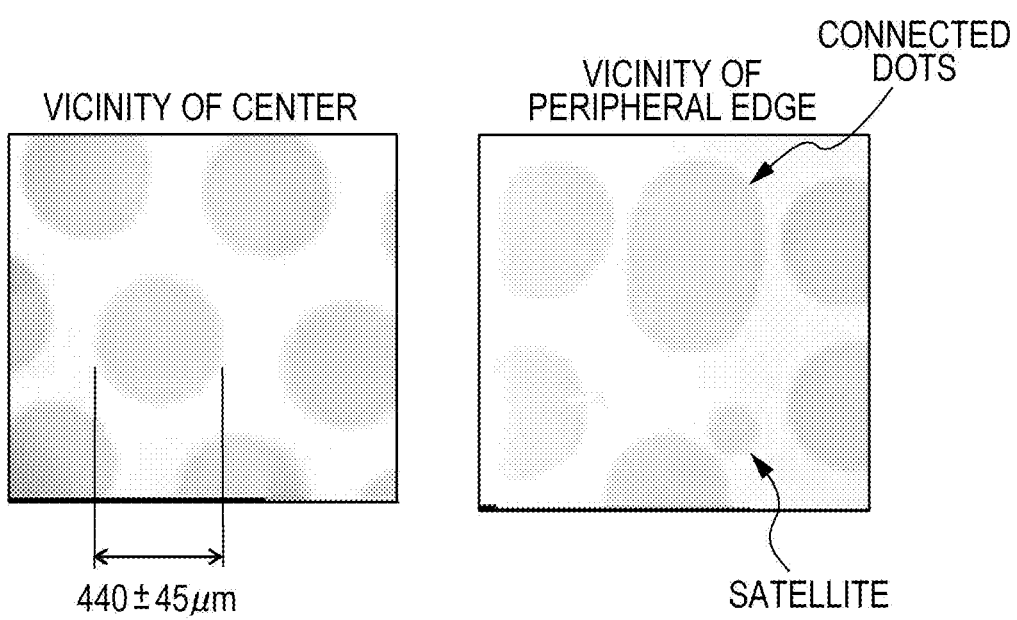

FIGS. 11A-11B are partially enlarged views illustrating a specific example of the pattern in the spectacle lens according to the present embodiment. Note that the pattern 20 is a dot pattern formed of the plurality of dots (identically shaped portions) 21 in the illustrated example, and microscopic observation results of the dot pattern arranged in the vicinity of the center of the first surface of the lens member and microscopic observation results of the dot pattern arranged in the vicinity of a peripheral edge of the same optical surface are illustrated side by side. Further, FIG. 11A illustrates an example of the dot pattern according to the present embodiment obtained by the laser processing, and FIG. 11B illustrates an example of a dot pattern obtained using an inkjet recording method as a comparative example.

As illustrated in FIG. 11A, the pattern 20, which is the dot pattern according to the present embodiment, is configured by arranging the dots (identically shaped portions) 21 on the optical surface, and a dimensional variation of each of the dots 21 is set to ±10% or less, preferably 6% or less, and more preferably 2% or less.

Further, even when comparing the dots 21 forming the dot pattern arranged in the vicinity of the center of the optical surface of the spectacle lens 10 and the dots 21 forming the dot pattern arranged in the vicinity of the peripheral edge of the optical surface, each dimensional variation is set to ±10% or less, preferably 6% or less, and more preferably 2% or less.

The "dimensional variation" referred to herein refers to at least one and preferably both of (1) a variation in diameter dimension between the respective dots 21 each having a substantially perfect circular shape when viewed in a plane, and (2) a variation in vertical and horizontal diameter dimensions (aspect ratio) of a certain dot 21. Specifically, regarding the above (1), the dimensional variation in diameter of each of the dots 21 falls within, for example, 440±44 μm or less, preferably 440±26 μm or less, and more preferably 440±8 μm or less both in the vicinity of the center and in the vicinity of the peripheral edge of the optical surface. Further, regarding the above (2), the variation in aspect ratio of each of the dots 21 falls within, for example, 440±44 μm or less, preferably 440±26 μm or less, and more preferably 440±8 μm or less.

On the other hand, in the dot pattern obtained using the inkjet recording method illustrated in FIG. 11B, the dimensional variation of each dot exceeds about ±10%, specifically, 440±44 μm. Further, particularly in the vicinity of the peripheral edge of the optical surface, there is a possibility that connected dots where dots are connected and satellites (small dots) that appear to be splashed around the original dots are generated due to a time difference of ink landing, and there is a high tendency for the variation in aspect ratio to increase.

That is, when the first surface of the lens member is the convex curved surface, the dimensional variation exceeding about ±10%, a dot shape collapse (aspect ratio variation), and the like may occur, for example, in the inkjet recording method. On the other hand, if a series of processes are performed through the positioning using the first surface as the reference as described in the present embodiment, the pattern 20 formed on the first surface side can be suppressed to have the dimensional variation of ±10% or less, preferably 6% or less, and more preferably 2% or less even when the object to be processed is the prism lens. In particular, the degree of improvement in the variation in the aspect ratio in the above (2) is higher than that in the case of the inkjet recording method.

Therefore, even in the case of forming a dot pattern formed by arranging the plurality of dots 21 on the curved optical surface, the dot pattern is formed with extremely high accuracy. As a result, stable quality can be ensured for the lens member after patterning.

In particular, when the first surface is the convex curved surface, there is a high possibility that the maximum dimensional variation occurs between the vicinity of the center of the first surface and the vicinity of the peripheral edge. However, the maximum dimensional variation can be suppressed to ±2% or less if the patterning is performed by the irradiation of laser light while supporting the three-dimensional control of the focal position as described in the present embodiment. Therefore, for example, even when a dot pattern is arranged over the entire first surface, the dot pattern is formed with extremely high accuracy. As a result, stable quality can be ensured for the lens member after patterning.

Note that specific values for the diameter dimension of the dot 21 have been given as examples in the above description, but the present invention is not necessarily limited thereto.

It is conceivable to set a diameter DD of the dot 21 to, for example, 0.01 mm or more, more preferably 0.05 mm or more, even more preferably 0.1 mm or more, and further, for example, 5.0 mm or less, preferably 2.0 mm or less, more preferably 1.0 mm or less, and even more preferably 0.5 mm or less.

Further, it is conceivable to set a distance AD from the center of one dot 21 to the center of another adjacent dot 21 to, for example, 0.1 mm or more, preferably 0.2 mm or more, and more preferably 0.3 mm or more, and further, for example, 5.0 mm or less, preferably 3.0 mm or less, and more preferably 1.0 mm or less.

It is conceivable to set the distance AD/diameter DD to preferably more than 1.0, more preferably 1.1 or more, and even more preferably 1.2 or more, and further, preferably 2.0 or less, more preferably 1.8 or less, and even more preferably 1.5 or less.

In any case, the dimensional variation is suppressed to ±10% or less, preferably 6% or less, and more preferably 2% or less in the present embodiment.

(8) Effects of Laser Processing According to Present Embodiment

With the laser processing according to the present embodiment, the following effects can be obtained.

In the present embodiment, the laser processing machine 30 performs the three-dimensional control of the focal position of the laser light based on the surface shape data acquired from the lens positioning mechanism after undergoing the positioning by the lens positioning mechanism. Therefore, it is possible to easily and highly accurately perform the three-dimensional control of the focal position of the laser light without requiring the data correction or the like in consideration of the prism amount regardless of whether or not the lens member, which is the object to be processed, is the prism lens and regardless of the curvature (curve) of the first surface of the lens member. Therefore, regarding the patterning performed on the first surface of the lens member, it is possible to improve the accuracy of the patterning while suppressing the complicated processing.

Further, since the series of processing is performed in the state where the lens member, which is the object to be processed, is erected in the vertical direction in the present embodiment, it is possible to prevent foreign substances and the like from adhering to the optical surface of the lens member in the course of the processing. Therefore, it is suitable for achieving the improvement in quality of the lens member.

Further, the pattern 20 formed by the patterning is configured such that the dimensional variation of each of the dots 21 forming the pattern 20 is set to ±10% or less, preferably 6% or less, and more preferably 2% or less. When the lens member, which is the object to be processed, is the prism lens, the dimensional variation exceeding about ±10% occurs, for example, in the inkjet recording method. However, if the patterning is performed while supporting the three-dimensional control of the focal position of the laser light based on the surface shape data of the first surface after undergoing the positioning using the first surface as the reference, the dimensional variation can be suppressed to ±10% or less, preferably 6% or less, and more preferably 2% or less. Therefore, the patterning can be performed with high accuracy even for the pattern 20 formed by arranging the plurality of dots 21.

In particular, when the first surface is the convex curved surface, there is a high possibility that the maximum dimensional variation occurs particularly in the vicinity of the center and the peripheral edge of the first surface. However, if the maximum dimensional variation is suppressed to ±10% or less, preferably 6% or less, and more preferably 2% or less, the accuracy of patterning on the thin film 13*a* can be increased, which is extremely suitable for ensuring the stable quality of the lens member.

(9) Modifications, etc.

Although the embodiment of the present invention has been described above, the above disclosed contents illustrate an exemplary embodiment of the present invention. That is, a technical scope of the present invention is not limited to the above-described exemplary embodiment, and can be variously changed within a scope not departing from a gist thereof.

Although the case where the lens member is the spectacle lens 10 or the irregular-shaped lens 10*a* has been mainly described as an example in the above-described embodiment, but the present invention is not limited thereto. That is, the lens member, which is the object to be processed, may be a lens member other than the spectacle lens 10 or the irregular-shaped lens 10*a* as long as the first surface which is the convex optical surface and the second surface which is the optical surface facing the first surface are provided.

Further, the case where the spectacle lens 10 or the irregular-shaped lens 10*a* is the prism lens has been given as an example, but a lens member having no prism amount can also be handled by the present invention.

Further, the case where the pattern 20 is the dot pattern formed of the plurality of dots (identically shaped portions) 21 has been described as an example in the above-described embodiment, but the present invention is not limited thereto. That is, the pattern 20 may be formed of, for example, a character or a figure, instead of being formed of the dots 21. Further, the pattern 20 may be partially formed, instead of being formed on the entire optical surface of the spectacle lens 10. Further, the fine dots 21 may be gathered to form a character, a figure, or the like.

REFERENCE SIGNS LIST

- 10 spectacle lens (lens member)
- 10*a* irregular-shaped lens (lens member)
- 11 lens substrate
- 12 HC film
- 13 patterning thin film
- 13*a* thin film
- 14 AR film
- 20 pattern
- 21 dot
- 30 laser processing machine
- 40 lens mounting base
- 41 notch
- 50 member holding unit
- 51 pad
- 52 joint
- 53 slide mechanism
- 54 elastic member
- 55 brake
- 56 first electric actuator
- 57 second electric actuator
- 60 attitude control unit
- 61 support claw
- 62 tapered portion
- 63 claw drive unit
- 64 claw rotation unit
- 70 sensor unit
- 71 contact
- 72 movement mechanism
- 80 auxiliary tool

The invention claimed is:

1. A lens positioning mechanism comprising:
 a member holding unit that has a function of holding a lens member from a second surface side of the lens member having a first surface, which is a convex optical surface, and a second surface, which is an optical surface facing the first surface, and biasing the held lens member toward a side of the first surface; and
 an attitude control unit that abuts on a predetermined portion on the first surface of the lens member biased on the member holding unit to regulate a position of the predetermined portion and positions the lens member in a predetermined attitude using the predetermined portion as a reference without using an edge position of the first surface as the reference.

2. The lens positioning mechanism according to claim 1, wherein
 the attitude control unit is configured to abut on an annular region on the first surface as the predetermined portion to regulate the position.

3. The lens positioning mechanism according to claim 1, wherein
 the attitude control unit is configured to abut on three or more points on the first surface, which are separated from each other, as the predetermined portion to regulate the position.

4. The lens positioning mechanism according to claim 1, wherein
 the member holding unit has
 a pad that holds the second surface of the lens member by vacuum suction, and
 a joint that swingably supports the pad and is configured to be capable of switching between a movable state and a fixed state of a swinging portion.

5. The lens positioning mechanism according to claim 1, wherein
 the member holding unit has an elastic member that stretches and contracts along a biasing direction of the lens member.

6. The lens positioning mechanism according to claim 5, wherein
 the member holding unit has a brake that maintains a bent state of the elastic member.

7. The lens positioning mechanism according to claim 1, further comprising
 a sensor unit that measures a relative position of a predetermined point on the first surface of the lens member with respect to a regulation position when positioned by the attitude control unit.

8. The lens positioning mechanism according to claim 1, wherein
 the lens member is a spectacle lens.

9. The lens positioning mechanism according to claim 8, wherein
 the spectacle lens is an irregular-shaped lens after cutting or polishing.

10. A lens producing apparatus comprising:
 the lens positioning mechanism according to claim 1; and
 a member processing unit that performs a predetermined process on the first surface of the lens member positioned in the predetermined attitude by the lens positioning mechanism.

11. The lens positioning mechanism according to claim 1, wherein the member holding unit is configured to hold the lens member via an auxiliary tool attached to the second surface of the lens member.

12. A method for producing a lens member comprising:
 a step of biasing a lens member to a side of a first surface from a second surface side of the lens member having the first surface, which is a convex optical surface, and a second surface, which is an optical surface facing the first surface;
 a step of regulating a position of a predetermined portion on the first surface of the biased lens member by abutment with the predetermined portion and positioning the lens member in a predetermined attitude, using the predetermined portion as a reference without using an edge position of the first surface as the reference; and
 a step of performing a predetermined process on the first surface of the lens member positioned in the predetermined attitude.

13. The method for producing a lens member according to claim 12, wherein the lens member is a spectacle lens, and the spectacle lens is an irregular-shaped lens after cutting or polishing.

14. The method for producing a lens member according to claim 12, wherein the lens member is biased to the side of the first surface from the second surface side via an auxiliary tool attached to the second surface of the lens member.

* * * * *